United States Patent
Tomimatsu et al.

(10) Patent No.: US 6,447,941 B1
(45) Date of Patent: Sep. 10, 2002

(54) FUEL CELL

(75) Inventors: Norihiro Tomimatsu, Kawasaki; Hideyuki Ohzu, Yokohama; Yoshihiro Akasaka, Kawasaki; Kazuhiro Yasuda, Yokohama; Masahiro Takashita, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/523,178

(22) Filed: Mar. 10, 2000

Related U.S. Application Data

(63) Continuation-in-part of application No. 09/408,121, filed on Sep. 29, 1999, now abandoned.

(30) Foreign Application Priority Data

Sep. 30, 1998 (JP) ............................................. 10-278759
Jun. 9, 1999 (JP) ............................................. 11-162630

(51) Int. Cl.⁷ ................................................. H01M 8/04
(52) U.S. Cl. ............................. 429/26; 429/34; 429/17; 429/120
(58) Field of Search ............................ 429/34, 38, 39, 429/26, 17, 19, 33, 120; 427/115

(56) References Cited

U.S. PATENT DOCUMENTS

| | | | | |
|---|---|---|---|---|
| 4,562,123 A | * | 12/1985 | Shimizu et al. | 429/27 |
| 4,824,741 A | * | 4/1989 | Kunz | 429/26 |
| 5,364,711 A | * | 11/1994 | Yamada et al. | 129/15 |
| 6,248,460 B1 | * | 6/2001 | Surampudi et al. | 429/15 |

FOREIGN PATENT DOCUMENTS

| JP | 08-45526 | * | 2/1996 | H01M/08/04 |
|---|---|---|---|---|

* cited by examiner

Primary Examiner—Stephen Kalafut
Assistant Examiner—R. Alejandro
(74) Attorney, Agent, or Firm—Oblon, Spivak, McClelland, Maier & Neustadt, P.C.

(57) ABSTRACT

Disclosed is a fuel cell in the form of stacked unit cells each having a power generating section composed of a fuel electrode, an oxidant electrode, and an electrolyte plate held therebetween, which are placed on top of the other. In this fuel cell, a liquid fuel is introduced into each unit cell by the capillary action and evaporated in each unit cell in a fuel evaporating portion, so that the fuel electrode is supplied with the evaporated fuel.

32 Claims, 8 Drawing Sheets

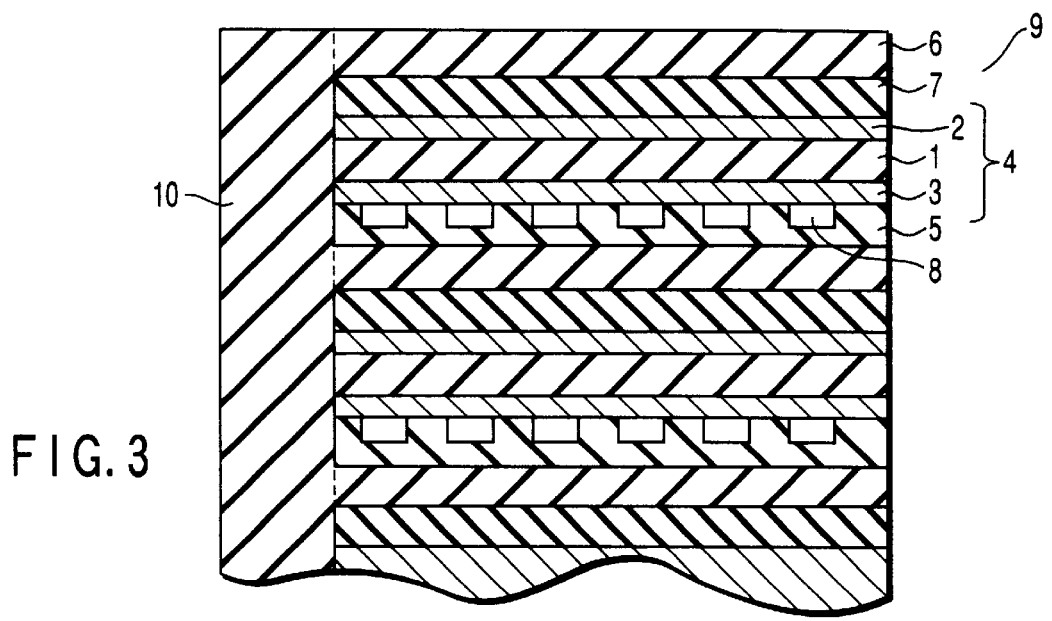
FIG. 3
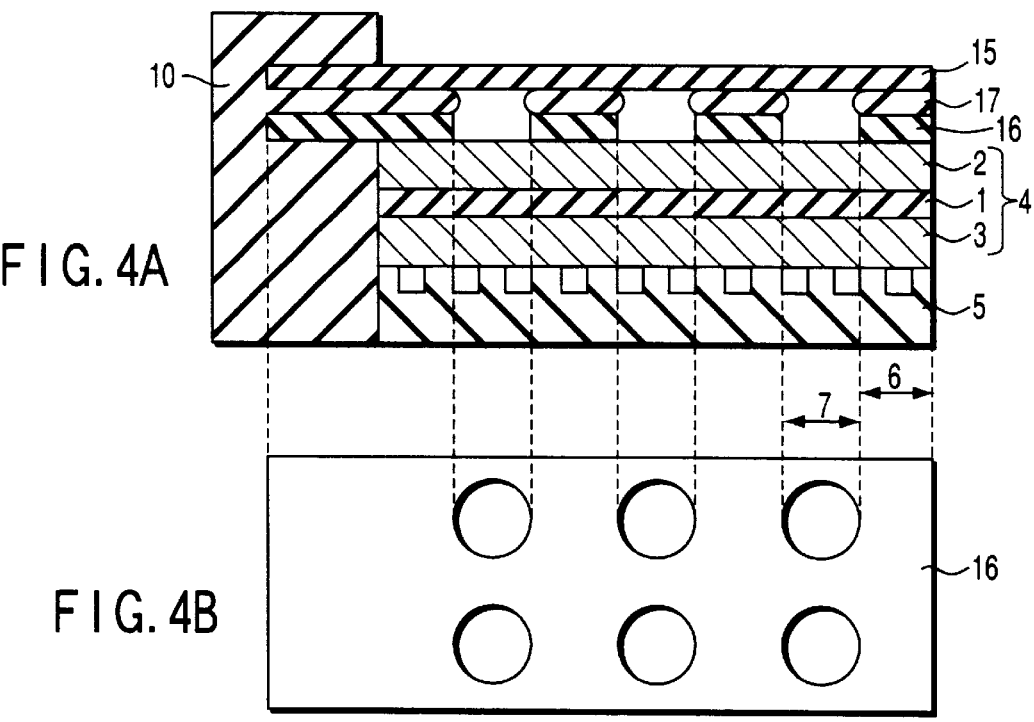
FIG. 4A
FIG. 4B
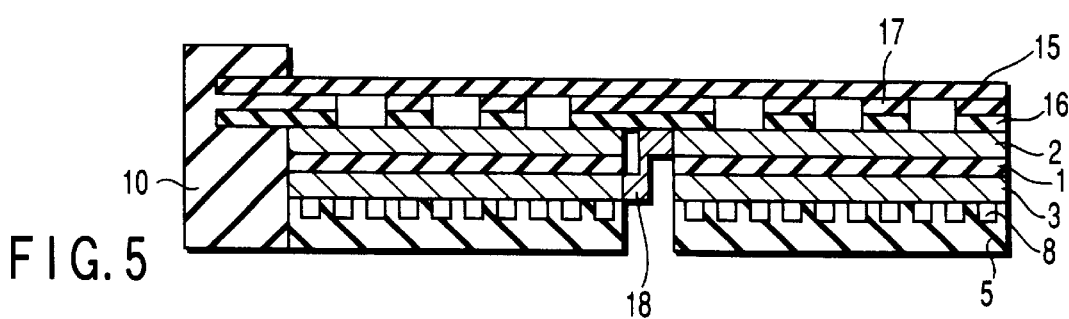
FIG. 5

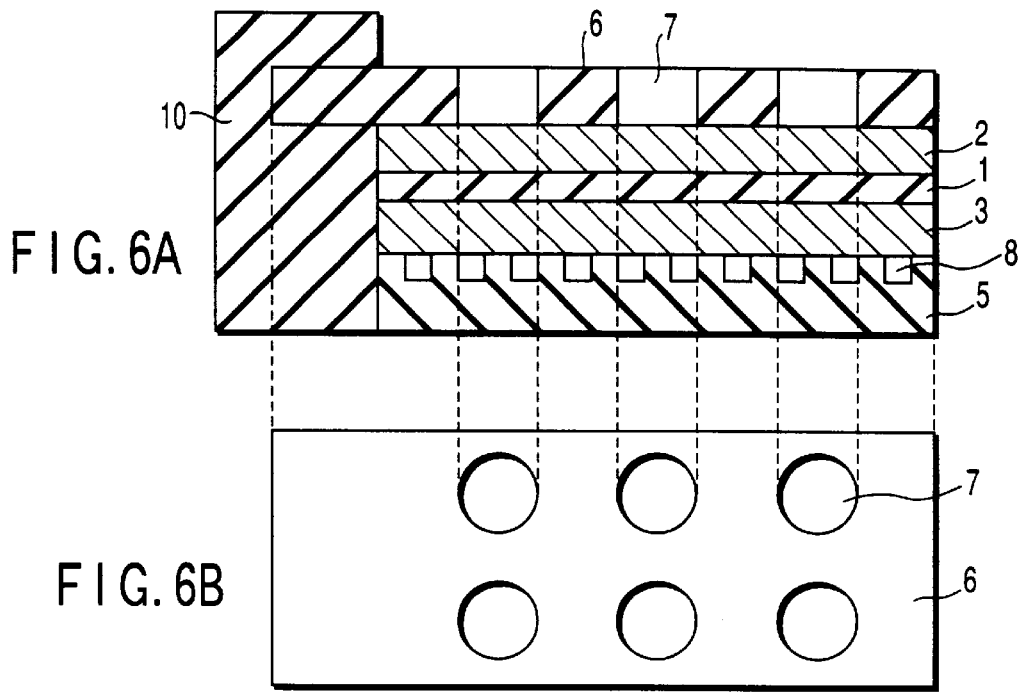
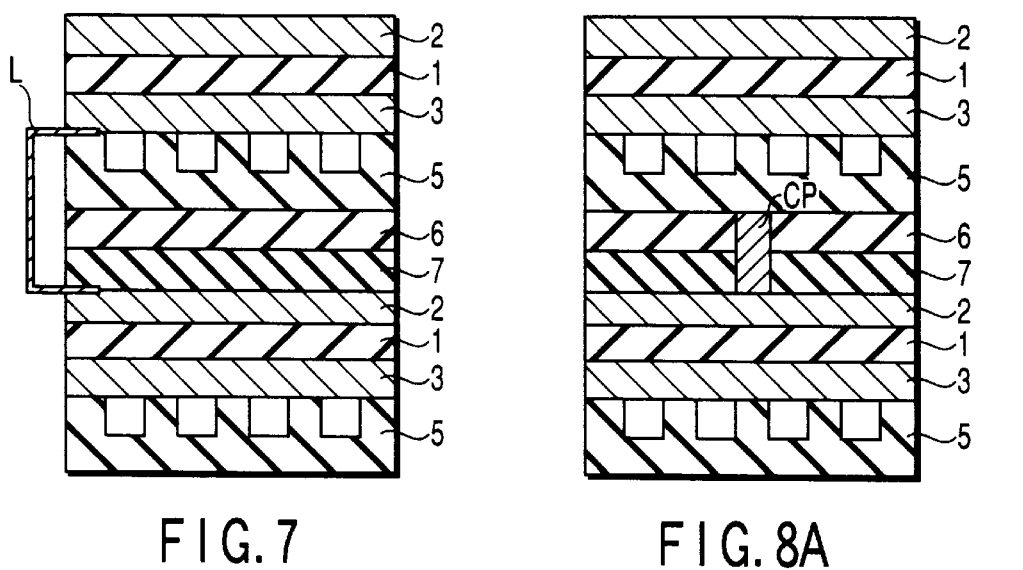
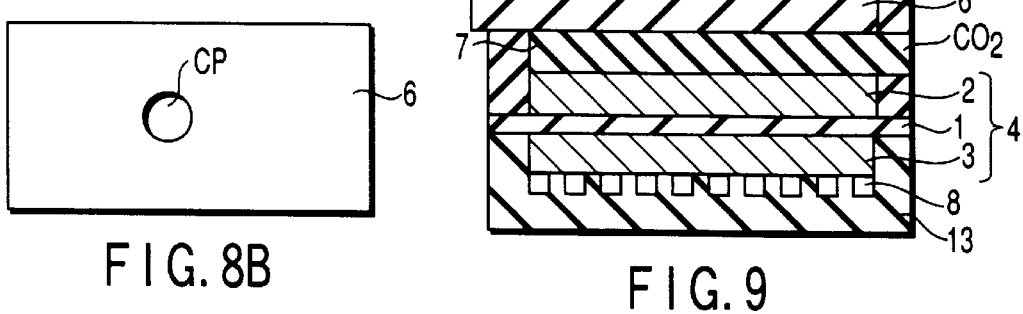

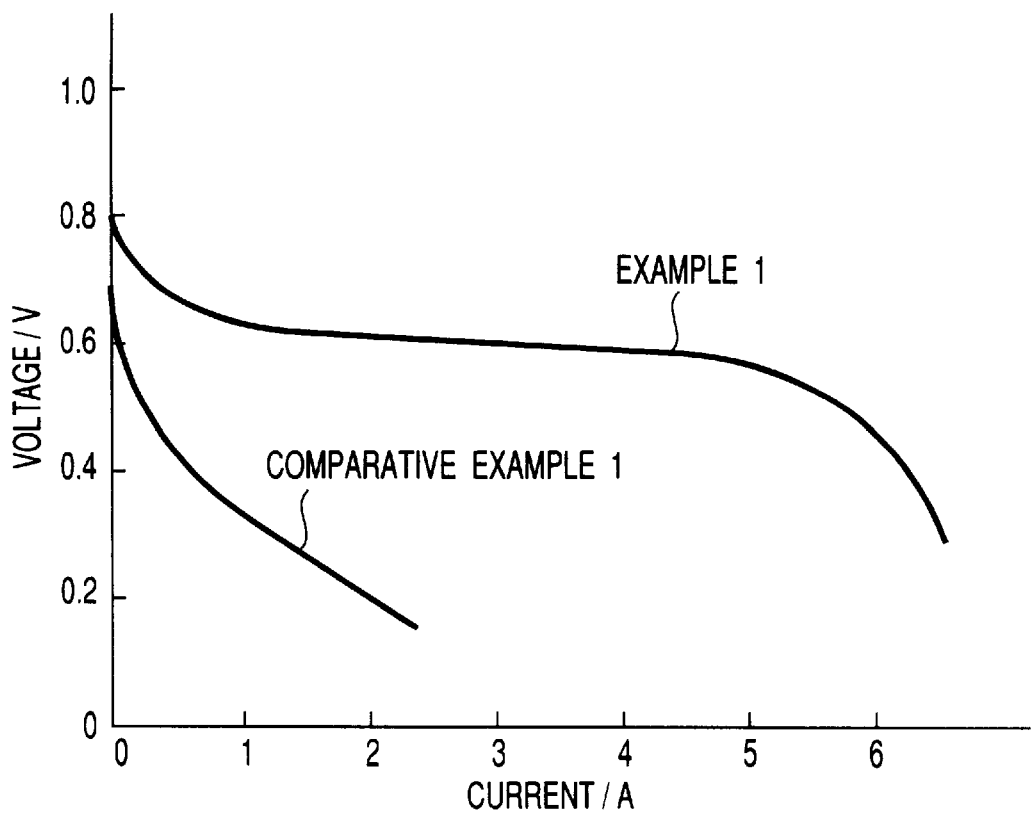
F I G. 10
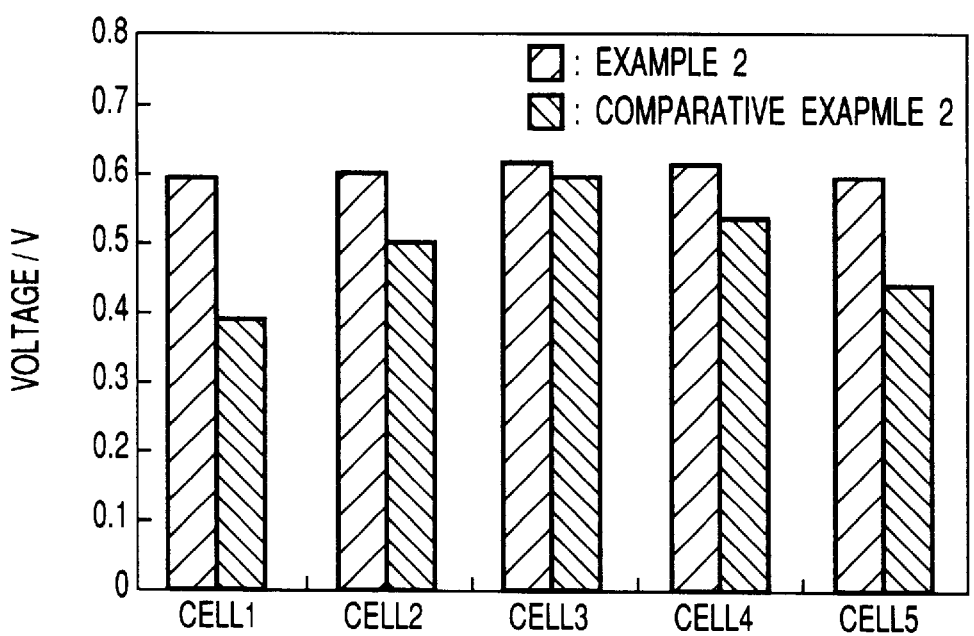
F I G. 11

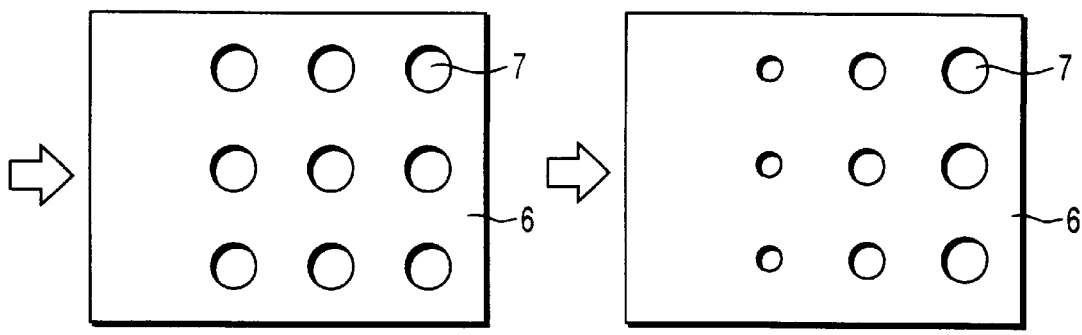
FIG. 12    FIG. 13
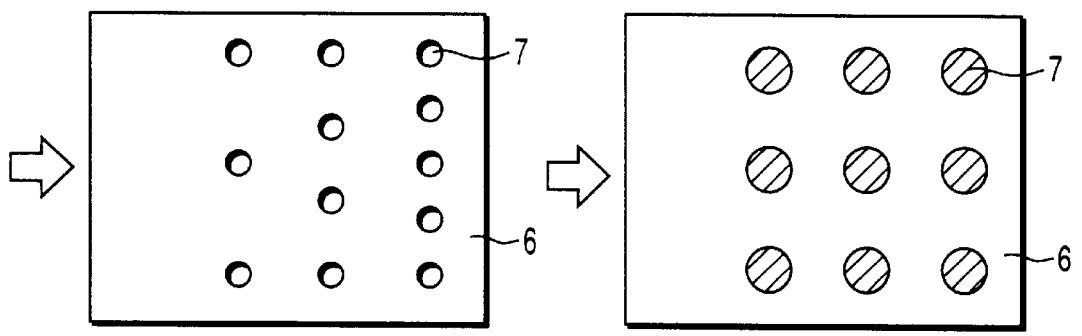
FIG. 14    FIG. 15
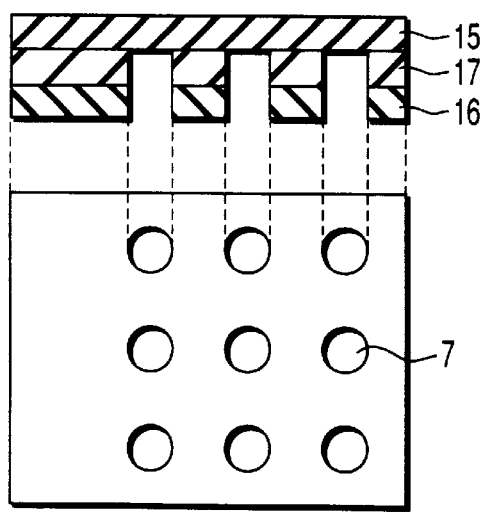
FIG. 16A
FIG. 16B
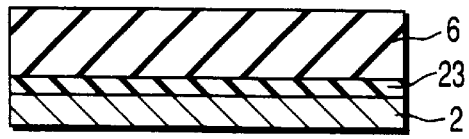
FIG. 17

FIG. 23B

FUEL CELL

CROSS-REFERENCE TO RELATED APPLICATIONS

This is a Continuation-in-Part application of U.S. patent application Ser. No. 09/408,121, filed Sep. 29, 1999, now abandoned the entire contents of which are incorporated herein by reference.

This application is based upon and claims the benefit of priority from the prior Japanese Patent Applications No. 10-278759, filed Sep. 30, 1998; and No. 11-162630, field Jun. 9, 1999, the entire contents of which are incorporated herein by reference.

BACKGROUND OF THE INVENTION

The present invention relates to a fuel cell, particularly, to a fuel cell readily available in a reduced size.

Fuel cells are nowadays attracting attentions because of their efficient energy conversion into electricity.

Fuel cells are classified according to the kind of electrolyte and fuel employed. Those which depend on a gaseous fuel are classified as phosphoric acid fuel cells, molten carbonate salt fuel cells, solid electrolyte fuel cells, and alkaline electrolyte fuel cells. Those which depend on liquid fuel are classified as methanol fuel cells and hydrazine fuel cells. These fuel cells are intended to supply electric power to large machines, and they need auxiliary equipment such as compressors and pumps to introduce a fuel gas or liquid and an oxidant gas into them. In addition to their complex structure, they consume electric power for the introduction of fuel and oxidant into them.

The current trend in the fields of office automation (OA) equipment, audio systems, and radio sets is toward miniaturization and portability resulting from the development of semiconductor technologies. This goal is achieved by using handy primary or secondary batteries as the power source. However, batteries are inherently limited in operating time and hence OA equipment depending on them for power supply is necessarily limited in operating time. Primary batteries are rather short in operating time for their weight and hence they do not suit portable equipment. On the other hand, secondary batteries need a power source for recharging which takes a long time. This limit the site where OA equipment can be used and also limits the length of service time. Thus, conventional primary and secondary batteries cannot run small machines for a long period of time, and there is an increasing demand for long-life batteries.

In order to meet this requirement, the present inventors propose that conventional primary and secondary batteries be replaced by fuel cells. Fuel cells offer the advantage of generating electricity continuously as long as they are supplied with fuel and oxidant. Therefore, they contribute to the size reduction and power saving of OA equipment.

Fuel cells employ air as the oxidant and hence they are not restricted in site and time for their use as far as the oxidant is concerned. However, they need a large volume of gaseous fuel with a low density even though the power consumption of OA equipment is small. This is unfavorable to the size reduction of power source. By contrast, liquid fuel has a higher density than gaseous fuel and hence extremely favorable to fuel cells for small-size machines. If fuel cells using liquid fuel are available in small size, they would be able to run small-sized machines for a long time. A hindrance to realization of such a small-sized power system is the necessity for pumps and blowers to feed liquid fuel to the fuel cell proper. The resulting power system is complex in structure and large in size.

Methanol fuel cells (which use methanol as liquid fuel) are explained below. They are broadly classified into liquid feed type and vapor feed type according to the type of fuel feeding. The former is so designed as to feed liquid fuel in the form of liquid, and the latter is so designed as to feed liquid fuel in the form of gas after evaporation. A fuel cell of liquid feed type is supplied with methanol which is circulated under pressure by a pump through the methanol tank and fuel cell proper. Therefore, it necessarily needs a pump for fuel supply. By contrast, in the case of a fuel cell of vapor feed type, methanol (as a liquid fuel) is introduced into a vaporizer by a pump and then methanol vapor is fed to the fuel cell proper by a blower. Unconsumed methanol vapor discharged from the outlet of the fuel electrode is recycled to the methanol tank through a condenser. This process needs a complex system which is not suitable for small-sized machines. By the way, a fuel cell for practical use is usually composed of stacked unit cells. The disadvantage of this construction is that the fuel being fed under pressure by a pump or blower fluctuates in flow through stacked unit cells, causing variation in performance from one cell to another.

One way to address this problem is to utilize capillary action to feed liquid fuel. In a fuel cell of this type, liquid fuel is fed to the fuel electrode from the fuel tank by capillary action. Therefore, it dispenses with a fuel pump, unlike fuel cells of liquid feed type, and hence is suitable for size reduction.

However, a fuel cell of this type still has the disadvantage of being poor in performance due to low electrode reactivity. In addition, it poses another problem of cross-over, which is a phenomenon that an organic liquid fuel (such as methanol) passes through the electrolyte membrane to reach the oxidant electrode, if a proton-conducting solid polymer such as perfluorosulfonic acid (available under a trade name of "Nafion" from Du Pont) is used as electrolyte.

BRIEF SUMMARY OF THE INVENTION

An object of the present invention is to provide a fuel cell fed with liquid fuel by capillary action, which is characterized by the increased fuel electrode reactivity and the reduced cross-over (a phenomenon that an organic liquid fuel passes through the electrolyte membrane to reach the oxidant electrode).

Another object is to provide a fuel cell that permits simplifying the liquid fuel supply system and also permits miniaturizing the cell size while maintaining a high performance.

According to a first aspect of the present invention, there is provided a fuel cell to produce an electromotive force through the reaction between a liquid fuel and an oxidant gas, the fuel cell comprising a fuel electrode, an electrolyte plate positioned adjacent to the fuel electrode, an oxidant electrode positioned adjacent to the electrolyte plate and opposite to the fuel electrode, and a fuel evaporating portion positioned adjacent to the surface opposite to that surface of the fuel electrode which is in contact with the electrolyte plate.

According to a second aspect of the present invention, there is provided a fuel cell to produce an electromotive force through the reaction between a liquid fuel and an oxidant gas, the fuel cell comprising a first power generating section and a second power generating section, which are placed on top of the other, with a separator interposed therebetween, the first power generating section being composed of a first fuel electrode, a first fuel evaporating layer, a first electrolyte plate, and a first oxidant electrode, which are placed sequentially one over another, the second power generating section being composed of a second fuel electrode, a second fuel evaporating layer, a second electrolyte plate, and a second oxidant electrode, which are placed sequentially one over another, the first and second fuel evaporating layers being fed with the liquid fuel through a liquid fuel passage which is formed adjacently to both of the first and second power generating sections.

According to a third aspect of the present invention, there is provided a fuel cell, comprising:

an oxidant electrode;

an electrolyte plate laminated on the oxidant electrode;

a fuel electrode laminated on the electrolyte plate;

a liquid fuel holding section laminated on the fuel electrode; and a liquid fuel evaporating portion positioned to be in contact with both the fuel electrode and the liquid fuel holding portion.

According to a fourth aspect of the present invention, there is provided a fuel cell, comprising:

an oxidant electrode;

an electrolyte plate laminated on the oxidant electrode;

a fuel electrode laminated on the electrolyte plate;

a liquid fuel holding portion;

a plurality of unit cells each having a liquid fuel evaporating portion positioned in contact with both the fuel electrode and the liquid fuel holding portion; and a liquid fuel source connected to each of the plurality of unit cells through the liquid fuel holding portion.

According to a fifth aspect of the present invention, there is provided a fuel cell, comprising:

an electrolyte plate;

an oxidant electrode and a fuel electrode mounted to have the electrolyte plate interposed therebetween;

a liquid fuel evaporating section mounted on the fuel electrode; and a liquid fuel holding portion positioned away from the fuel electrode by a distance not larger than 1 cm and connected to the liquid fuel evaporating portion.

According to a sixth aspect of the present invention, there is provided a fuel cell, comprising:

an electrolyte plate;

an oxidant electrode and a fuel electrode arranged to have the electrolyte plate interposed therebetween; and a liquid fuel holding portion for holding the fuel supplied to the fuel electrode, wherein the fuel held by the liquid fuel holding portion is evaporated by the reaction heat of the cell reaction.

Further, according to a seventh aspect of the present invention, there is provided a fuel cell, comprising:

an oxidant electrode;

an electrolyte plate laminated on the oxidant electrode;

a fuel electrode laminated on the electrolyte plate; and a liquid fuel permeating-evaporating member mounted on the fuel electrode and having a first side on the side of the fuel electrode and a second side facing the first side.

The liquid permeating-evaporating member may include a porous plate having a densifying treatment applied to the surface of the first side. A plurality of through-holes can extend across the first side and the second side may be formed in the porous plate. The surface of the first side can be in contact with the fuel electrode.

In this case, the through-holes may have a predetermined diameter and may be regularly arranged. Further, a porous body may be located in the through-hole, and the capillary phenomenon of the porous body may be smaller than that of the porous plate forming the liquid fuel permeating-evaporating member.

The diameter of the through-hole can be gradually increased in the flowing direction of the liquid fuel.

The number of the through-holes can be gradually increased in the flowing direction of the liquid fuel.

The liquid fuel permeating-evaporating member can be formed of a porous plate having a densifying treatment applied to the surface on a first side thereof. A plurality of recesses may be formed on the surface of the first side, and the surface of the first side may be contact with the fuel electrode.

The liquid fuel permeating-evaporating member may include a first plate mounted on the first side and provided with a plurality of through-holes, and a flat second plate laminated on the first plate with a spacer interposed therebetween. The first plate may be brought into contact with the fuel electrode.

The liquid fuel permeating-evaporating member may be formed of a porous plate. The average pore diameter of the porous plate can be gradually increased from the second side toward the first side, and the surface of the first side can be contact with the fuel electrode.

The liquid fuel permeating-evaporating member may be formed of a porous plate. A wet-proofing treatment can be applied to the first side, a hydrophilic treatment can be applied to the second side, and the surface of the first side can be contact with the fuel electrode.

The liquid fuel permeating-evaporating member may include a porous plate arranged on the second side and a gas-liquid separating membrane arranged in contact with both the porous plate and the fuel electrode.

The liquid fuel permeating-evaporating member may be formed of a dense plate and may include grooves formed on the surface in contact with the gas-liquid separating membrane and extending in the flowing direction of the liquid fuel.

The liquid fuel permeating-evaporating member may include a dense plate arranged on the second side and a frame member arranged in contact with both the dense plate and the fuel electrode. Grooves extending in the flowing direction of the liquid fuel can be formed on that surface of the dense plate which is in contact with the frame member.

In this case, the width of the groove formed in the dense plate can be continuously diminished in the flowing direction of the liquid fuel, and the depth of the groove can be continuously diminished in the flowing direction of the liquid fuel.

The liquid fuel permeating-evaporating member may be formed of a dense plate having a plurality of through-holes. Grooves communicating with the through-holes can be formed in the surface on the second side of the dense plate, and the grooves can communicate with the inlet port of the liquid fuel.

The liquid fuel permeating-evaporating member may consist of a plurality of hollow fibers differing from each other in length and bundled together to form a plate-like configuration. The plurality of hollow fibers can extend in the flowing direction of the liquid fuel.

The liquid fuel permeating-evaporating member may include a fuel evaporating portion arranged on the first side and a fuel permeating portion arranged in contact with both the fuel evaporating portion and the fuel electrode. The fuel permeating portion may have at least two sub-fuel permeating sections serving to connect the fuel inlet port to the fuel evaporating portion.

The liquid fuel permeating-evaporating member may include a hollow plate arranged on the second side and a frame member arranged on the first side in contact with the hollow plate. The hollow plate may have a plurality openings on the surface in contact with the frame member and the frame member can be in contact with the fuel electrode.

In each case, the liquid fuel within the liquid fuel permeating-evaporating member can be evaporated by the reaction heat of the cell reaction.

The fuel cell of the present invention does not need any driving unit, such as pump, to feed fuel, because it introduces liquid fuel into the cell by capillary action. In addition, it does not need any auxiliary equipment, such as fuel evaporator, because the liquid fuel introduced into it is vaporized by the reaction heat in the fuel evaporating layer. The vaporized fuel in the fuel evaporating layer is kept almost saturated, so that as much fuel as consumed is vaporized from the fuel permeating layer and as much fuel as vaporized is introduced into the cell by the capillary action. Since fuel is supplied in proportion to its consumption, there is very little fuel which is discharged unreacted. This obviates the necessity of a subsystem to treat discharged fuel, unlike the conventional liquid fuel cell. Thus, the fuel cell of the present invention can feed liquid fuel smoothly without requiring such auxiliary equipment as a pump, a blower, a fuel evaporator and a condenser, and hence it can be made small in size.

The fuel cell of the present invention may be constructed of a plurality of unit cells (which are placed on top of the other to form a stack). In this case, fuel is vaporized in each unit cell, so that fuel is uniformly distributed among unit cells. This prevents unit cells from fluctuating in performance depending on their position in the stack, unlike the conventional fuel cell of evaporation feed type. The feeding of fuel in gaseous form ensures high activity and high performance at the fuel electrode as in the case of the conventional fuel cell of the evaporation feed type. Another advantage of feeding fuel in gaseous form is that it is possible to prevent methanol cross-over which is a problem that arises when a proton-conducting solid polymer membrane, such as perfluorosulfonic acid ("Nafion" from Du Pont), is used as the electrolyte and a liquid organic fuel, such as methanol, is used as the fuel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a cross sectional view showing another structure of the components of the fuel cell;

FIG. 4A is a cross sectional view showing another example of the fuel cell of the present invention;

FIG. 4B is a plan view of a flat plate used in the fuel cell shown in FIG. 4A;

FIG. 5 is a cross sectional view showing another example of the fuel cell of the present invention;

FIG. 6A is a cross sectional view showing another example of the fuel cell of the present invention;

FIG. 6B is a plan view showing the fuel permeating-evaporating section used in the fuel cell shown in FIG. 6A;

FIG. 7 is a cross sectional view showing another example of the fuel cell of the present invention;

FIG. 8A is a cross sectional view showing another example of the fuel cell of the present invention;

FIG. 8B is a plan view showing a fuel permeating layer used in the fuel cell shown in FIG. 8A;

FIG. 9 is a cross sectional view showing another example of the fuel cell of the present invention;

FIG. 10 is a graph showing current-voltage characteristic curves of the fuel cells of Example 1 and Comparative Example 1;

FIG. 11 is a graph showing the cell outputs for the fuel cells of Example 2 of the present invention and Comparative Example 2;

FIG. 12 is a plan view showing the fuel permeating-evaporating member used in the fuel cell of Example 3 of the present invention;

FIG. 13 is a plan view showing the fuel permeating-evaporating member used in the fuel cell of Example 4 of the present invention;

FIG. 14 is a plan view showing the fuel permeating-evaporating member used in the fuel cell of Example 5 of the present invention;

FIG. 15 is a plan view showing the fuel permeating-evaporating member used in the fuel cell of Example 7 of the present invention;

FIG. 16A is a cross sectional view showing the fuel permeating-evaporating member used in the fuel cell of Example 8 of the present invention;

FIG. 16B is a plan view showing the fuel permeating-evaporating member used in the fuel cell of Example 8 of the present invention;

FIG. 17 is a cross sectional view showing the fuel permeating structure used in the fuel cell of Example 11 of the present invention;

FIG. 23B is a plan view showing the fuel permeating member used in the fuel cell of Example 17 of the present invention;

DETAILED DESCRIPTION OF THE INVENTION

To further illustrate the present invention, and not by way of limitation, the following examples are given.

Figure 1:
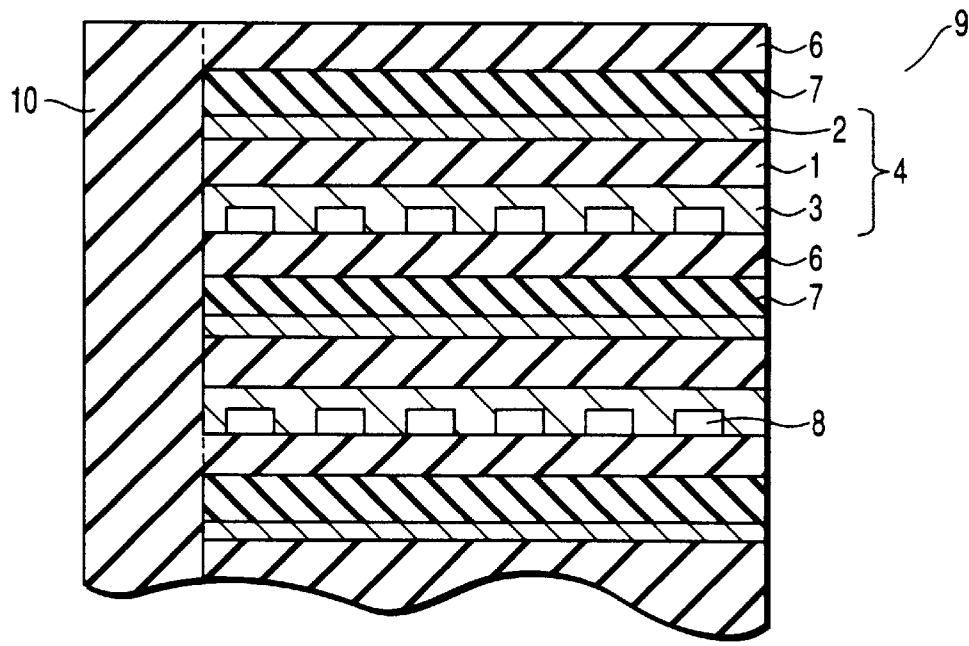
FIG. 1 a cross sectional view showing one structure of the components of the fuel cell of the present invention.

This example is directed to a fuel cell whose important components are shown in the cross sectional view of FIG. 1. There is shown an electrolyte plate 1, which is held between a fuel electrode (anode) 2 and an oxidant electrode (cathode) 3. The electrolyte plate 1, the fuel electrode 2, and the oxidant electrode 3 constitute the power generating section 4. The fuel electrode 2 and the oxidant electrode 3 are made of an electrically conductive porous material so that they allow the passage of fuel and oxidant gas as well as electrons.

The fuel cell of the present invention has a fuel permeating layer 6 and a fuel evaporating layer 7 placed on top of the other, which introduce liquid fuel into the fuel cell by the capillary action. The fuel evaporating layer 7 is interposed between the fuel electrode 2 and the fuel permeating layer 6; it evaporates the fuel which has been introduced into the fuel cell and feeds the fuel (in the form of vapor) to the fuel electrode. A set of the fuel permeating layer 6, the fuel evaporating layer 7, and the power generating section 4 is placed on top of another set consecutively, with a separator 5 interposed between them, so that they constitute a stack 9 which is the fuel cell proper. The grooves 8 through which the oxidant gas is supplied are formed continuously in that surface of the separator 5 which is in contact with the oxidant electrode 3.

In the fuel cell of the present invention, the fuel permeating layer is arranged in the position to which the reaction heat generated by the cell reaction is transmitted. It is desirable to arrange the fuel permeating layer in close proximity to the electrodes such that the permeating layer is heated by the reaction heat to a temperature not lower than about 40° C.

As a means to feed liquid fuel to the fuel permeating layer 6 from the fuel tank, there is formed a liquid fuel passage 10 along at least one side of the stack 9. Upon introduction into the liquid fuel passage 10, the liquid fuel is fed to the fuel permeating layer 6 by the capillary action from the side of the stack 9. Then, the fuel is vaporized by the fuel vaporizing layer 7 and the fuel in the vapor form is fed to the fuel electrode 2. In order to supply liquid fuel to the fuel permeating layer 6 by the capillary action, the fuel cell is constructed such that the liquid fuel which has been introduced into the liquid fuel passage 10 comes into direct contact with the end surface of the fuel permeating layer.

The separator 5, the fuel permeating layer 6, and the fuel evaporating layer 7 are made of an electrically conductive material so that they function as a current collector to transmit electrons generated in the fuel cell. In addition, a catalyst layer (in the form of a layer, an island, or a granule) may be formed between the electrolyte plate 1 and the fuel electrode 2 or the oxidant electrode 3, according to need. The scope of the present invention is not restricted by the presence or absence of such a catalyst layer. Alternatively, it is possible to cause the fuel electrode 2 or the oxidant electrode 3 to function as the catalyst electrode. The catalyst electrode may be of single layer structure or a multi-layer structure. In the latter case, the catalyst layer is formed of paper or cloth on an electrically conductive substrate.

The fuel cell in this example has the separator 5 which functions also as a channel which permits the oxidant gas to flow therethrough. The advantages of using the multipurpose separator 5 include a size reduction and reduction in the number of parts used. Incidentally, the separator 5 may be replaced by an ordinary channel.

The liquid fuel passage 10 should basically be constructed such that the liquid fuel is introduced from the fuel reservoir (not shown) into the fuel permeating layer 6 by the capillary action. One way to supply liquid fuel from the fuel reservoir to the liquid fuel passage 10 is to permit the liquid fuel to drop spontaneously by gravity and to enter the liquid fuel passage 10. This gravitational method offers the advantage of assuring the introduction of the liquid fuel into the liquid fuel passage 10, although it requires that the fuel reservoir should be installed above the top of the stack 9. Another method is to introduce the liquid fuel from the liquid fuel reservoir by the capillary action of the liquid fuel passage 10. This method does not require that the joint between the liquid fuel reservoir and the liquid fuel passage 10 (or the fuel entrance of the liquid fuel passage 10) should be arranged above the top of the stack 9. When combined with the above-noted gravitational method, this method offers the advantage of freedom to install the fuel tank at any place.

In order to introduce the liquid fuel into the liquid fuel passage 10 by the capillary action and then to feed the liquid fuel smoothly into the fuel permeating layer 6 by the capillary action, it is important for the liquid fuel passage 10 to produce a greater capillary action than the fuel permeating layer 6. Incidentally, the liquid fuel passage 10 may be formed on one side or both sides of the stack 9.

The fuel reservoir described above may be made detachable from the fuel cell proper, so that the fuel can be run for a prolonged period of time by renewing the fuel reservoir. The feeding of the liquid fuel from the fuel reservoir to the liquid fuel passage 10 may be accomplished by gravity (as mentioned above) or by pressure in the reservoir. An alternative feeding method is to extract the liquid fuel by the capillary action of the liquid fuel passage 10.

Once introduced into the liquid fuel passage 10 as mentioned above, the liquid fuel is then fed to the fuel permeating layer 6 by the capillary action. The structure of the fuel permeating layer 6 is not specifically restricted as far as it permits the liquid fuel to permeate through it by the capillary action. It may be made of a porous material (composed of particles and filler), non-woven fabric produced by paper-making method, or woven cloth of fiber.

It is possible for the fuel permeating layer to have, for example, a passage of the liquid fuel and to be provided with a gas-liquid separating membrane at the interface with the fuel evaporating layer 7. Further, it is possible to use a small clearance formed between two plates of glass, plastic material, metal, etc. as the fuel permeating layer.

The following explanation is applied to the fuel permeating layer 6 made of a porous material. The fuel permeating layer 6 draws liquid fuel into it by the capillary action. This capillary action originates from the porous material constituting the fuel permeating layer 6. For the effective use of the capillary action, the fuel permeating layer 6 of porous material should be formed such that it pores are connected to one another and its pores have an adequate pore diameter. In addition, the pores should be continuous from one side of the fuel permeating layer 6 to the other, so that the liquid fuel is fed smoothly by the capillary action in the lateral direction, too.

The porous material constituting the fuel permeating layer 6 may have any pore diameter which is not specifically restricted, as far as it permits the liquid fuel to be drawn into the liquid fuel passage 10. The pore diameter should preferably be 0.01 to 150 $\mu$m in view of the capillary action of the liquid fuel passage 10. In addition, the pore volume as an index of pore continuity should preferably be 20 to 90% of the porous material. With a pore diameter smaller than 0.01 $\mu$m, the porous material presents difficulties in production of the fuel permeating layer 6. With a pore diameter larger than 150 $\mu$m, the porous material is poor in its capillary action. With a pore volume less than 20%, the porous material has closed pores in a higher ratio and hence is poor in its capillary action. With a pore volume more than 90%, the porous material has a higher ratio of continuous pores but is poor in strength and present difficulties in fabrication. Practically, the pore diameter should preferably be 0.5 to 100 $\mu$m and the pore volume should preferably be 30 to 75%. Incidentally, the pore diameter is defined as the diameter of a sphere which fits into the pore.

Figure 2:
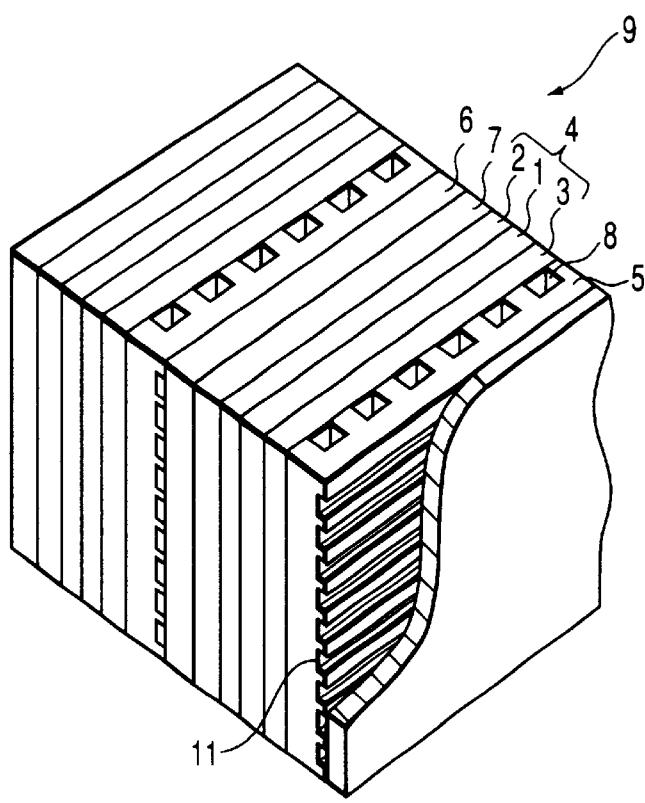
FIG. 2 is a perspective view showing another structure of the components of the fuel cell of the present invention.

Liquid fuel feeding grooves 11 may be formed in the surface in contact with the fuel permeating layer 6 of the separator 5 (serving also as the channel), as shown in FIG. 2. The capillary action of these grooves may be used to draw liquid fuel into the fuel permeating layer 6. In other words, the capillary action is not limited to that of the porous material constituting the fuel permeating layer 6. In this case, the liquid fuel passage 10 should be formed such that the open ends of the liquid fuel feeding grooves 11 come into direct contact with the liquid fuel. Alternatively, it is possible to use the capillary action of the liquid fuel feeding grooves 11 in combination with the capillary action of the porous material constituting the fuel permeating layer 6.

The liquid fuel feeding grooves 11 are not specifically restricted in configuration as far as they produce an adequate capillary action. However, they should be formed such that their capillary action is smaller than that of the fuel permeating layer 6. Otherwise, the liquid fuel will not be fed from the liquid fuel passage 10 to the fuel permeating layer 6, though the liquid fuel will be fed from the liquid fuel passage 10 to the liquid fuel feeding grooves 11.

The liquid fuel feeding grooves 11 are intended to extract liquid fuel from the liquid fuel passage 10 by their capillary action. Therefore, they should be formed such that their capillary action is greater than that of the liquid fuel passage 10 in the case where the liquid fuel is introduced from the fuel reservoir into the liquid fuel passage 10 by its capillary action. Thus, the configuration of the liquid fuel feeding grooves 11 should be formed in view of the configuration of the porous material constituting the fuel permeating layer 6 and the liquid fuel passage 10.

The separator 5 serving also as the channel is provided with the liquid fuel feeding grooves 11 extending in the horizontal direction, as mentioned above. This construction permits the liquid fuel to be fed from the entire surface of the end of the fuel electrode 2 to the fuel permeating layer 6 and also permits the liquid fuel to be fed in the lateral direction across the fuel permeating layer 6 through the grooves 11. This makes it possible to feed liquid fuel more smoothly from the liquid fuel passage 10 to the fuel permeating layer 6.

In the example described above, an explanation is given for a fuel cell in which the separator 5 serving also as the channel is provided with both the oxidant gas feeding grooves 8 and the liquid fuel feeding grooves 11. Alternatively, the fuel permeating layer 6 and the oxidant electrode 3 may be individually provided with channels. In this case, one set of channels should be separated from another set of channels by an electrically conductive plate to block the passage of gas, or the holes on the surface of at least one set of channels should be closed, so that the liquid fuel is separated from the oxidant gas. In order to decrease the number of parts used and to reduce the size of the fuel cell, it is desirable to use the channels for dual purposes.

The examples described above are directed to a fuel cell which has the stacks 9 each composed of the power generating section 4, the fuel permeating layer 6, and the duel evaporating layer 7, which are placed on top of the other, with each stack separated by the separator 5 serving also as the channels. However, the fuel cell of the present invention does not necessarily need the separator and channels. For example, it may be constructed of a plurality of stacks 12, each composed of the power generating section 4, the fuel permeating layer 6, and the fuel evaporating layer 7, as shown in FIG. 3. In this case, the oxidant gas feeding grooves 8 may be continuous ones formed in the surface in contact with the fuel permeating layer 6 of the oxidant electrode 3, as shown in FIG. 3.

In the case where the fuel permeating layer 6 and the oxidant electrode 3 are in direct contact with each other as pointed out above, it is necessary to provide a means to prevent the liquid fuel from being drawn from the fuel permeating layer 6 to the oxidant electrode 3. The reason for this is that the liquid fuel drawn into the oxidant electrode 3 hampers the flow of the oxidant gas, thereby preventing the fuel cell reactions. One way to prevent the liquid fuel from entering the oxidant electrode 3 is to use a porous material (for the oxidant electrode) having a pore diameter large enough not to draw the liquid fuel by the capillary action. The porous material should be selected from those which have practically feasible particle diameters. However, there may be an instance in which the pore diameter should be small enough to draw liquid fuel by the capillary action. In this case, it is necessary to close the pores in that surface of the oxidant electrode 3 which faces the porous body as the fuel permeating layer 6. In the case where the oxidant gas feeding grooves 8 are formed in the oxidant electrode 3, it is possible to close the pores (excluding the grooves 8) in that surface of the oxidant electrode 3 which faces the fuel permeating layer 6. In this case, however, there is a possibility that the liquid fuel enters the oxidant electrode 3 through the side of the oxidant gas feeding grooves 8. In such a case, it is desirable to close pores in the surface of contact between the oxidant electrode 3 and the fuel permeating layer 6 and also to close the pores in the side of the oxidant gas feeding grooves 8.

Upon introduction into the fuel cell, the liquid fuel is vaporized in the fuel evaporating layer 7 and the resulting fuel gas reaches the fuel electrode 2. Where the fuel evaporating layer 7 is formed of a porous body, it is important that the fuel evaporating layer 7 should have a capillary action smaller than that of the fuel permeating layer 6. Otherwise, the liquid fuel permeates from the fuel permeating layer 6 into the fuel evaporating layer 7 in the form of liquid without evaporation. It follows therefore that the liquid fuel is fed into the fuel electrode 2.

It is necessary for the fuel evaporating layer 7 to have a space into which the liquid fuel evaporates from the liquid permeating layer 6. It is also necessary for the fuel evaporating layer 7 to conduct electrons. The fuel evaporating layer 7 is not specifically restricted in its configuration as far as these requirements are met. The necessary space may be formed by interposing between the fuel electrode 2 and the fuel permeating layer 6 an electrically conductive porous material or an electrically conductive mesh or electrically conductive wires, fibers or particles.

It is desirable to set the fuel evaporating section such that the interface between the fuel holding section and the fuel evaporating section is not more than 1 cm apart from the electromotive force generating section. In this case, the reaction heat of the fuel cell can be effectively utilized for evaporation of the liquid fuel. Further, it is possible to transmit effectively the reaction heat to the liquid fuel by arranging a suitable member between the fuel electrode 2 and the fuel holding section, as already described. Incidentally, the distance between the interface noted above and the electromotive force generating section should more preferably be not larger than 5 mm.

The porous material constituting the fuel evaporating layer 7 is not specifically restricted with respect to the pore diameter, etc. as already pointed out, as far as it permits the vaporized fuel to diffuse, without drawing the liquid fuel from the fuel permeating layer 6. The porous material should preferably have a pore diameter greater than 5 µm in view of the capillary action of the fuel permeating layer 6. In addition, the porous material should preferably have a pore volume of about 20 to 90%.

The example shown in FIG. 1 has the fuel permeating layer 6 and the fuel evaporating layer 7 which are formed of different materials. This is not necessarily essential as far as the fuel cell is constructed such that the liquid fuel is introduced into the fuel cell by the capillary action and is vaporized in the fuel cell. For example, it is possible to employ a porous inclined material whose average pore diameter changes in going in its thickness direction. In this case, the porous material is arranged such that the face having a larger average pore diameter comes into contact with the fuel electrode 2. In other words, the face having a smaller pore diameter functions as the fuel permeating layer and the face having a larger pore diameter functions as the fuel vaporizing layer. Alternatively, the porous plate may be formed in two layers consisting of different materials, one layer being less wettable by liquid fuel and the other layer being more wettable by liquid fuel. The more wettable layer functions as the fuel permeating layer and the less wettable layer functions as the fuel evaporating layer. The less wettable face is brought into contact with the fuel electrode 2.

FIG. 1 shows that the fuel evaporating layer 7 is interposed between the fuel permeating layer 6 and the fuel electrode 2. However, the present invention is not limited this construction. Specifically, it is possible to form the fuel evaporating portion in a part of the fuel permeating portion for use as the fuel permeating-evaporating member. An example of the particular construction will now be described.

Specifically, FIG. 4A is a cross sectional view exemplifying a fuel cell of the particular construction. Further, FIG. 4B is a plan view showing the fuel permeating-evaporating member used in the fuel cell shown in FIG. 4A.

As shown in the drawings, a small clearance 17 capable of producing a capillary action is formed between two flat plates 15 and 16 arranged to face each other. In other words, the clearance between the two flat plates 15 and 16 forms a liquid permeating section.

Openings are formed in one of the two flat plates, i.e., the flat plate 16 in contact with the fuel electrode 2. As a result, the liquid fuel is held in the portion positioned between the flat plates 15 and 16. On the other hand, the clearance 17 positioned between the fuel electrode 2 and the flat plate 15 is enlarged, resulting in failure to hold the liquid fuel and in formation of a free space. The liquid fuel held in the clearance 17 is evaporated by the reaction heat of the cell at the interface with the free space noted above so as to be supplied to the fuel electrode 2 through the perforation of the perforated plate 16. To be brief, the portion where the flat plates 15 and 16 are positioned to face each other, i.e., the portion where the perforation of the perforated plate 16 is not positioned, functions as the fuel permeating layer 6, and the clearance formed between the fuel electrode 2 and the flat plate 15, i.e., the perforated portion of the perforated plate 16, functions as the fuel evaporating layer 7. The thickness of the cell can be decreased by arranging in parallel the fuel permeating layer 6 and the fuel evaporating layer 7 in this fashion.

The particular construction is adapted for a flat plate type fuel cell in which unit cells arranged on a plane are electrically connected to each other.

FIG. 5 exemplifies a flat plate type fuel cell using the fuel cell shown in FIGS. 4A and 4B. Where unit cells are connected in series, the oxidant electrode of a first unit cell is connected to the fuel electrode of a second unit cell by a connecting conductor 18. Also, since the fuel permeating layer of each unit cell commonly uses the flat plates 15 and 16, the fuel introduction passage 10 can also be used commonly.

In this case, since the unit cells are connected to each other by using the connecting conductor 18, it is unnecessary for the flat plates 15 and 16 constituting the fuel permeating layer 6 and the fuel evaporating layer 7 to have an electrical conductivity and, thus, these flat plates 15 and 16 can be formed by using the ordinary glass or plastic material.

The method for forming the fuel evaporating section in a part of the fuel permeating layer is not limited to the method described above. For example, it is possible to use a porous plate as the fuel permeating layer 6 and to form a free space acting as the fuel evaporating portion 7 in a part of the porous plate in contact with the fuel electrode 2, as shown in FIG. 6. In the example shown in the drawing, the free space acting as the fuel evaporating portion is formed of a through-hole. However, it is also possible to use a concavity formed on the surface of the fuel electrode 2 as the fuel evaporating portion.

Further, it is possible to bury in the free space a porous body having pores sized larger than the pores of the porous body forming the fuel permeating layer 6. In this case, it is desirable to apply a treatment to prevent the liquid fuel from permeating directly from the fuel permeating layer 6 to reach the fuel electrode 2 to the interface between the porous body forming the fuel permeating layer 6 and the fuel electrode 2.

For example, it is desirable to clog the pores at the interface between the fuel permeating layer 6 and the fuel electrode 2 or to form a membrane impermeable to the liquid fuel at the interface noted above.

The fuel permeating-evaporating member will now be described more in detail. Specifically, the fuel permeating-evaporating member, which has a fuel permeating portion and a fuel evaporating portion, makes it possible to decrease the thickness of the member, compared with the case where each of these fuel permeating member and the fuel evaporating member are formed of individual members separately.

It is possible to use any of a conductive material or an insulating material for forming each of the liquid fuel permeating section and the fuel evaporating section. The conductive materials used in the present invention include, for example, carbon, a metal and polyaniline. On the other hand, the insulating materials used in the present invention include, for example, vinyl polymers such as polyethylene, polypropylene, polyacrylic ester, fluorine-containing resin, and polyvinyl chloride; engineering plastic materials such as polyimide, polyether, polyester, polysulfide, polysulfone, polycarbonate, polyurethane, and copolymers thereof; thermosetting resins such as epoxy resin, polyunsaturated esters, polyimide, phenolic resins and melamine resin; ceramics such as zeolite; and papers, though the insulating materials used in the present invention are not limited to these materials.

It is desirable to apply a water repelling treatment to the materials noted above when these materials are used for forming the fuel evaporating section. On the other hand, it is desirable to apply a hydrophilic treatment to these materials when these materials are used for forming the fuel permeating section. By applying these treatments, the fuel is prevented from being supplied to the fuel electrode in the form of a liquid.

Where an insulating material is used for forming the fuel permeating section 6 and the fuel evaporating section 7, it is desirable to use a conductive lead L for connecting the adjacent cells as shown in FIG. 7. Alternatively, it is possible to arrange a conductive member CP in a part of each of the fuel permeating section 6 and the fuel evaporating section 7 each consisting of an insulating material. Incidentally, FIG. 8B is a plan view showing the fuel permeating section 6 shown in FIG. 8A. In the example shown in FIG. 8B, the conductive member CP is arranged in the central portion of the fuel permeating section 6.

It is desirable for the fuel permeating section of the construction described above to exhibit a capillary action because the capillary action makes it unnecessary to use an auxiliary equipment for the fuel supply. To be more specific, it is desirable to use a porous body, an unwoven fabric, a woven fabric, paired plates, a grooved plate, a tube or a pipe for forming the fuel permeating section.

Where the liquid fuel is introduced into the fuel electrode by utilizing the capillary action of these materials, it is desirable to employ the construction that the capillary force is increased from the fuel inlet port in the permeating direction so as to allow the liquid fuel to permeate without fail from the inlet port to the other end. In the case of using, for example, a porous body, the particular object noted above can be achieved by gradually diminishing the pore size of the porous body from fuel inlet port in the fuel permeating direction. In the case of using a grooved plate, the groove width should be gradually diminished from the fuel inlet port in the fuel permeating direction. In the case of using paired plates, it is conceivable to diminish the distance between the plates from the fuel inlet portion in the fuel permeating direction.

Where, for example, a fuel permeating layer is formed by forming grooves in a dense plate sized at 32 mm×40 mm and having a thickness of 2 mm, it is desirable for the depth of the groove to be about 0.1 to 1.8 mm and for the pitch of the grooves to be about 0.05 to 2 mm. Where the dense plate used fails to meet these requirements, the capillary force is weakened or the permeating passageway is narrowed, resulting in failure to supply a sufficient amount of the liquid fuel to the unit cell.

In the case of employing any of these constructions, the fuel is gradually consumed from the fuel inlet port in the permeating direction. In order to supply the fuel uniformly within a plane, it is desirable to separate the fuel supply passage depending on the permeating distance. Further, for preventing the liquid fuel from being evaporated before the liquid fuel flows to reach the fuel evaporating section, it is desirable to seal the region around the permeating section with, for example, resin. In the case of using, for example, a porous body, it is effective to apply a densifying treatment to the porous body except the liquid fuel introducing portion or to cover the porous body with a liquid impermeable membrane.

It is not absolutely necessary for the fuel holding section to have a capillary force. If it is possible to use a liquid transfer means, it is possible to use, for example, a box-shaped liquid reservoir.

The shape of the liquid evaporating section is not particularly limited, as far as a free space for evaporating the fuel can be obtained. For example, it is possible to use, for example, a free space, a spacer (such as a frame, a punching sheet, a mesh, a wire, a fiber or grains), a porous body, a unwoven fabric, a woven fabric or a gas-liquid separating membrane as the fuel evaporating section. It is desirable for the size of the free space for evaporating the fuel to be determined on the basis of the size of the fuel cell, the output density, the fuel concentration, the operating temperature, etc.

The opening is not limited to a through-hole; a recess formed on the surface of the fuel permeating layer on the side of the fuel electrode can also be used as the particular opening.

It should be noted, however, that, where a free space formed within the permeating section is used as an evaporating section, the fuel tends to be gradually consumed from the fuel inlet port in the permeating direction so as to decrease the amount of the fuel. In order to avoid this difficulty and to make the fuel evaporating amount uniform within a plane, it is desirable to employ the construction that the evaporating area is gradually increased from the fuel inlet port in the permeating direction.

To be more specific, where an opening is formed as an evaporating section in the fuel permeating plate, the evaporating area can be made to increase from the fuel inlet port in the permeating direction by increasing the number of holes in the permeating direction of the liquid fuel. Alternatively, it is possible to enlarge the holes in the permeating direction of the liquid fuel. Further, it is conceivable to increase the circumferential length of the hole, i.e., to make the shape of the hole complex, in the permeating direction of the liquid fuel.

In the case of using a gas-liquid separating membrane as a fuel evaporating section, it is desirable for the membrane to consist of a porous body having a pore diameter of 0.01 $\mu$m to 10 $\mu$m and a porosity of 20% to 95%. Where the pore diameter is less than 0.01 $\mu$m, it is difficult for the fuel gas and the vapor to be diffused into the fuel electrode. On the other hand, where the pore diameter exceeds 10 $\mu$m, the liquid fuel tends to permeate through the pore. Also, where the porosity is less than 20%, the air supply amount is diminished so as to make it difficult to supply a sufficiently large amount of the evaporated fuel to the fuel electrode. On the other hand, where the porosity exceeds 95%, the mechanical strength tends to be unduly lowered. Further, it is desirable for the gas-liquid separating membrane to contain a fluorine-containing resin in view of the chemicals resistance and the water repellency.

The fuel permeating section and the fuel evaporating section described above can be combined appropriately to form a fuel permeating-evaporating member.

An actual fuel cell was constructed on the basis of the above-mentioned design concept. It is explained in the following.

EXAMPLE 1

A liquid fuel cell (unit cell) constructed as shown in FIG. 9 was prepared as follows. A carbon cloth was coated with a Pt—Ru catalyst to give a fuel electrode 2 (measuring 32 mm×32 mm). A carbon cloth was coated with a platinum black catalyst to give an oxidant electrode 3 (measuring 32 mm×32 mm). An electrolyte membrane 1 (of perfluorosulfonic acid) was held between the fuel electrode 2 and the oxidant electrode 3, with the catalyst layers in contact with the electrolyte membrane. The assembly was joined together by hot-pressing at 120° C. for 5 minutes under a pressure of 100 kg/cm$^2$, to give a power generating section 4. The power generating section 4 was combined with a fuel evaporating layer 7 and a fuel permeating layer 6. In this case, the fuel evaporating layer 7 acts as a fuel evaporating portion. The fuel evaporating layer 7 is a porous carbon plate having an average pore diameter of 100 $\mu$m and a porosity of 70%. The fuel permeating layer 6 is a porous carbon plate having an average pore diameter of 5 $\mu$m and a porosity of 40%. The resultant assembly was held between the oxidant electrode holder 13 and the fuel electrode holder 14, the former having oxidant gas feeding grooves 8 each having a depth of 2 mm and a width of 1 mm. Thus, there was obtained a unit cell having a reaction area of 10 cm$^2$.

The liquid fuel cell thus obtained was supplied with a methanol-water mixture mixed at 1:1 molar ratio as a liquid fuel. The liquid fuel was introduced by the capillary action through the side of the fuel permeating layer 6. The air at 1 atm as an oxidant gas was fed into the gas channels 8 at a flow rate of 100 mL (liters)/min so that the fuel cell generated electricity at 80° C. This fuel cell gave a current-voltage characteristic curve as shown in FIG. 10.

Comparative Example 1

A liquid fuel cell (unit cell) of the conventional type was prepared as follows. An assembly for the power generating section was prepared in the same way as in Example 1. The power generating section was held between a liquid fuel passage plate, which faced the fuel electrode, and the same gas channels as used in Example 1, which faced the oxidant electrode. As a result, obtained was a unit cell having a reaction area of 10 cm$^2$.

The liquid fuel cell thus obtained was supplied with a methanol-water mixture mixed at a 1:1 molar ratio as a liquid fuel. The liquid fuel was circulated by means of a pump at a pressure of 1 atm and a flow rate of 3 mL/min. The air at 1 atm used as an oxidant gas was fed into the gas channels at a flow rate of 100 mL/min, so that the fuel cell generated electricity at 80° C. This fuel cell gave a current-voltage characteristic curve as shown in FIG. 10.

It is apparent from FIG. 10 that the fuel cell according to Example 1 produces a stable output voltage until the current reaches about 5A, whereas, the liquid fuel cell in Comparative Example 1 only produces an output voltage which rapidly decreases with increase in current, with the available current being 2A at the highest. The reason for this poor performance is the low reactivity of the fuel electrode with the liquid fuel and the cross-over, which is a phenomenon that the liquid methanol passes through the electrolyte membrane to reach the oxidant electrode. In the case of the fuel cell according to Example 1 of the present invention, the fuel electrode is supplied with a vaporized fuel, which contributes to the high reactivity and serves to prevent the cross-over. This leads to high and stable output voltage under high loads.

EXAMPLE 2

Five unit cells prepared as in Example 1 were stacked one upon the other, and the projecting portions of the liquid fuel permeating members were connected to the stacked unit cells via fuel introducing passages loaded with a methanol-water mixture mixed at a mixing ratio of 1:1 so as to obtain a fuel cell of the construction as shown in FIG. 1.

The air of 1 atm used as an oxidant gas was fed into the gas channel 8 at a flow rate of 500 mL/min so as to generate electric power under a load of 2A at 80° C. FIG. 11 shows the output voltages of the unit cells constituting the fuel cell thus prepared.

Comparative Example 2

An experiment was conducted as in Example 2, except that the fuel permeating member was removed to form a free space, and an evaporated fuel was supplied into the fuel introducing passage at a rate of 500 mL/min.

FIG. 11 also shows the output voltages of the unit cells constituting the fuel cell thus prepared.

As apparent from FIG. 11, the output voltages of the unit cells were substantially uniform in Example 2 of the present invention. In Comparative Example 2, however, the output voltages of some of the unit cells were low, leading to nonuniform output voltages of the unit cells.

A methanol-water mixture was used as the liquid fuel in each of Example 2 and Comparative Example 2. However, the liquid fuel used in the present invention is not limited to the methanol-water mixture. It is possible to use an optional liquid as a fuel in the present invention as far as the liquid is capable of a catalytic reaction with the catalyst or the like to supply hydrogen ions to the electrolyte. For example, it is also possible to use in the present invention alcohols such as ethanol, ethers such as dimethyl ether and hydrazine as the liquid fuel.

EXAMPLE 3

A densifying treatment was applied to one surface of a carbon porous plate used as a fuel permeating layer, said porous plate having an average pore diameter of 20 $\mu$m, sized at 32 mm×40 mm, and having a thickness of 5 mm. Also, 9 through-holes each having a diameter of 4 mm were made in the carbon porous plate to form a fuel evaporating section, thereby preparing a fuel permeating-evaporating member. FIG. 12 is a plan view showing the fuel permeating-evaporating member thus prepared. As shown in the drawing, the fuel permeating-evaporating member in this Example comprises a fuel evaporating section 7 consisting of the through-holes regularly arranged a predetermined distance apart from each other and a fuel permeating region 6. The liquid fuel flows in the direction denoted by an arrow.

The fuel permeating-evaporating member was laminated on the fuel electrode 2 of the power generating section 4 in a manner to permit that surface of the fuel permeating-evaporating member to which a densifying treatment was applied to be brought into contact with the fuel electrode, and a unit cell having a reaction area of 10 cm² was prepared as in Example 1.

In Example 2, a densifying treatment was applied to that surface of the carbon porous plate which faced the fuel electrode, making it possible to prevent the liquid fuel from being supplied directly to the fuel electrode. As a result, only the fuel evaporated from the inner wall of the through-hole providing the fuel evaporating section 7 is supplied to the fuel electrode 2.

EXAMPLE 4

A fuel permeating-evaporating member was prepared as in Example 3, except that the diameters of the through-holes formed as a fuel evaporating section were changed in the flowing direction of the liquid fuel. FIG. 13 is a plan view showing the fuel permeating-evaporating member thus prepared. As shown in the drawing, the fuel evaporating section 7 is formed by arranging in the flowing direction of the liquid fuel denoted by an arrow three columns of through-holes each consisting of three through-holes. Each of the three through-holes forming the first column in the flowing direction of the liquid fuel had a diameter of 3 mm. Each of the three through-holes forming the second column (or intermediate column) in the flowing direction of the liquid fuel had a diameter of 4 mm. Further, each of the three through-holes forming the third column (or the last column) in the flowing direction of the liquid fuel had a diameter of 5 mm.

The fuel permeating-evaporating member thus formed was laminated on the fuel electrode 2 of the power generating section 4 to permit that surface of the fuel permeating-evaporating section to which the densifying treatment was applied to be in contact with the fuel electrode. Then, a unit cell having a reaction area of 10 cm² was prepared as in Example 1.

In this Example, a densifying treatment was applied to the surface of the carbon porous plate on the side of the fuel electrode. Therefore, only the evaporated fuel is supplied from the inner wall of the through-holes acting as the fuel evaporating section 7 to the fuel electrode 2, as in Example 3.

EXAMPLE 5

A fuel permeating-evaporating member was prepared as in Example 3, except that the diameters and the arrangement of the through-holes formed as a fuel evaporating section were changed. FIG. 14 is a plan view showing the fuel permeating-evaporating member thus prepared. As shown in the drawing, the fuel evaporating section 7 is formed by arranging in the flowing direction of the liquid fuel denoted by an arrow three columns of through-holes consisting of three, four and five through-holes, respectively. Each of these through-holes had a diameter of 3 mm. The first column in the flowing direction of the liquid fuel consisted of three through-holes. The second column (or intermediate column) in the flowing direction of the liquid fuel consisted of four through-holes. Further, the third column (or the last column) in the flowing direction of the liquid fuel consisted of five through-holes.

The fuel permeating-evaporating member thus formed was laminated on the fuel electrode 2 of the power generating section 4 to permit that surface of the fuel permeating-evaporating section to which the densifying treatment was applied to be in contact with the fuel electrode. Then, a unit cell having a reaction area of 10 cm² was prepared as in Example 1.

In this Example, a densifying treatment was applied to the surface of the carbon porous plate on the side of the fuel electrode. Therefore, only the evaporated fuel is supplied from the inner wall of the through-holes acting as the fuel evaporating section 7 to the fuel electrode 2, as in Example 3.

EXAMPLE 6

A fuel permeating-evaporating member was prepared as in Example 3, except that the through-holes formed as a fuel evaporating section were replaced by recesses. To be more specific, recesses each having a diameter of 4 mm and a depth of 3 mm were formed to form three columns each consisting of three recesses on that surface of the fuel permeating plate 6 to which a densifying treatment was applied.

The fuel permeating-evaporating member thus formed was laminated on the fuel electrode 2 of the power generating section 4 to permit that surface of the fuel permeating-evaporating section to which the densifying treatment was applied to be in contact with the fuel electrode. Then, a unit cell having a reaction area of 10 cm² was prepared as in Example 1.

In this Example, a densifying treatment was applied to the surface of the carbon porous plate on the side of the fuel electrode. Therefore, only the evaporated fuel is supplied from the inner wall of the through-holes acting as the fuel evaporating section 7 to the fuel electrode 2, as in Example 3.

EXAMPLE 7

A fuel permeating-evaporating member was prepared as in Example 3, except that a predetermined material was loaded in the through-holes formed as a fuel evaporating section so as to prepare a fuel permeating-evaporating member. FIG. 15 is a plan view showing the fuel permeating-evaporating member thus prepared. As shown in the drawing, a carbon porous body having pores having an average pore diameter of 100 μm was buried in each of the through-holes so as to form the fuel evaporating section 7 in the fuel permeating-evaporating member.

The fuel permeating-evaporating member thus formed was laminated on the fuel electrode 2 of the power generating section 4 to permit that surface of the fuel permeating-evaporating section to which the densifying treatment was applied to be in contact with the fuel electrode. Then, a unit cell having a reaction area of 10 cm² was prepared as in Example 1.

In this Example, the fuel evaporating section is formed of a carbon porous body having a good heat conductivity, making it possible to utilize effectively the reaction heat generated in the power generating section for evaporation of the fuel.

EXAMPLE 8

Tow polycarbonate plates each sized at 32 mm×40 mm and having a thickness of 1 mm were prepared, and a plurality of holes each having a diameter of 3 mm were formed in one of these polycarbonate plates. These two polycarbonate plates were laminated one upon the other with glass beads having a diameter of 40 μm interposed therebetween, followed by sealing two longer sides of the laminate structure so as to form a fuel permeating-evaporating member. FIG. 16A is a cross sectional view showing the resultant fuel permeating-evaporating member, with FIG. 16B being a plan view showing the fuel permeating-evaporating member shown in FIG. 16A. As shown in the drawings, a flat polycarbonate plate 15 and a perforated polycarbonate plate 16 are laminated one upon the other with glass beads 17 interposed therebetween so as to form the fuel permeating-evaporating section of the present invention. The liquid fuel permeates through the clearance between the two polycarbonate plates and can be evaporated from the through-holes made in the perforated polycarbonate plate 16.

The fuel permeating-evaporating member thus prepared was laminated on the fuel electrode 2 of the power generating section 4 to permit the perforated plate 16 to be brought into contact with the fuel electrode. Then, a unit cell having a reaction area of 10 cm² was prepared as in Example 1.

EXAMPLE 9

Prepared was a porous carbon plate sized at 32 mm×40 mm and having a thickness of 5 mm. The pores of the porous carbon plate were distributed such that the average pore diameters were inclined in the thickness of the porous carbon plate. To be more specific, the average pore diameters in the thickness direction of the porous carbon plate were inclined from 10 μm to 150 μm. In the porous carbon plate of the particular construction, the region having small average pore diameters functions as a fuel permeating region. On the other hand, the region having large average pore diameters functions as a fuel evaporating region. It follows that the porous carbon plate can be used as a fuel permeating-evaporating member.

The fuel permeating-evaporating member of the particular construction was laminated on the fuel electrode of the power generating section 4 to permit that surface of the porous carbon plate which has a large average pore diameter to be brought into contact with the fuel electrode. Then, a unit cell having a reaction area of 10 cm² was prepared as in Example 1.

EXAMPLE 10

Prepared was a porous carbon plate sized at 32 mm×40 mm and having a thickness of 5 mm. A wet-proofing treatment was applied to one surface of the porous carbon plate, with a hydrophilic treatment being applied to the other surface. In the porous carbon plate thus prepared, the surface having the wet-proofing treatment applied thereto functions as a fuel permeating section. On the other hand, the other surface having the hydrophilic treatment applied thereto functions as a fuel evaporating section. It follows that the porous carbon plate can be used as a fuel permeating-evaporating member.

The fuel permeating-evaporating member thus prepared was laminated on the fuel electrode of the power generating section 4 to permit the surface having the wet-proofing treatment applied thereto to be brought into contact with the fuel electrode. Then, a unit cell having a reaction area of 10 cm² was prepared as in Example 1.

EXAMPLE 11

A porous carbon plate sized at 32 mm×40 mm and having a thickness of 5 mm, which was used as a fuel permeating plate 6, was laminated on the fuel electrode 2 of the power generating section 4 with a gas-liquid separating member 23 made of a fluorine-containing resin interposed therebetween, as shown in FIG. 17. In this case, the porous carbon plate and the gas-liquid separating membrane collectively act as a fuel permeating-evaporating member. The gas-liquid separating membrane used had an average pore diameter of 0.6 μm and a porosity of 70%.

A unit cell having a reaction area of 10 cm² was prepared as in Example 1, except that used was the structure shown in FIG. 17.

In driving the fuel cell, a part of the fuel permeating plate 6 is allowed to project to the outside of the holder so as to permit the projecting portion to be dipped in the liquid fuel tank. As a result, the liquid fuel permeates through the fuel permeating plate 6 made of the porous carbon body, and the evaporated fuel gas alone is supplied through the gas-liquid separating member 23 to the fuel electrode 2.

EXAMPLE 12

Figure 18:
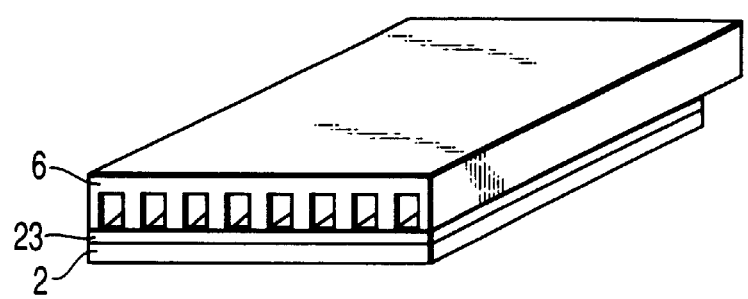
FIG. 18 is an oblique view showing the fuel permeating structure used in the fuel cell of Example 12 of the present invention.

A fuel permeating plate 6 was prepared by forming a plurality of grooves on the surface of a dense carbon plate sized at 32 mm×40 mm and having a thickness of 2 mm. These grooves, each having a depth of 1.5 mm, extended in the longitudinal direction of the carbon plate and arranged at a pitch of 0.5 mm. As shown in FIG. 18, the particular fuel permeating plate 6 was laminated on the fuel electrode of the power generating section 4 to permit that surface of the fuel permeating plate 6 on which were formed the grooves to be positioned on the side of the fuel electrode 2. A gas-liquid separating membrane 23 was interposed between the fuel permeating plate 6 and the fuel electrode 2. A unit cell having a reaction area of 10 cm² was prepared as in Example 1, except that the structure shown in FIG. 18 was used for preparing the unit cell.

In driving the fuel cell, a part of the fuel permeating plate 6 is allowed to project to the outside of the holder so as to permit the projecting portion to be dipped in the liquid fuel tank. As a result, the liquid fuel permeates through the grooves of the fuel permeating plate 6 made of the carbon plate, and the evaporated fuel gas alone is supplied through the gas-liquid separating member 23 to the fuel electrode 2.

EXAMPLE 13

Figure 19:
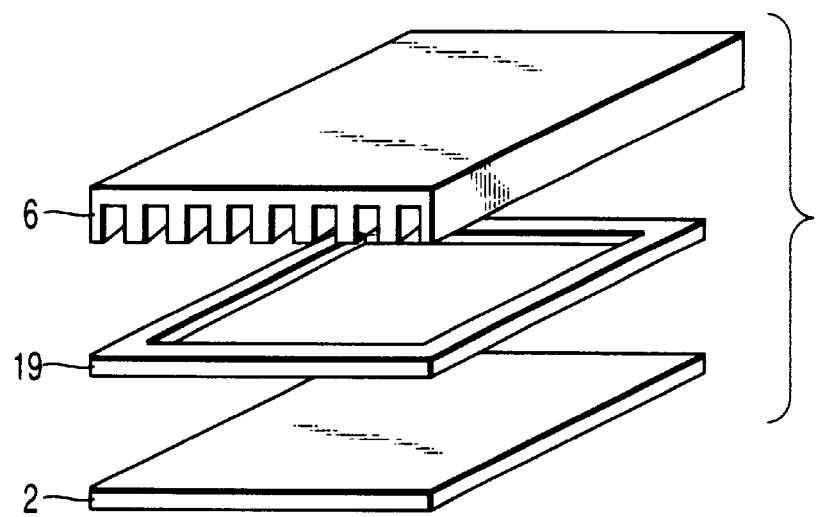
FIG. 19 is an oblique view showing the fuel permeating structure used in the fuel cell of Example 13 of the present invention.

A fuel permeating plate 6 was prepared by forming grooves in a dense carbon plate as in Example 12. The fuel permeating plate 6 thus prepared was laminated on the fuel electrode 2 of the power generating section 4 to permit that surface of the fuel permeating plate 6 on which were formed the grooves to be positioned on the side of the fuel electrode 2 with a carbon frame 19 interposed therebetween, as shown in FIG. 19. The carbon frame 19, which was sized at 32 mm square and had a width of 2 mm and a thickness of 1 mm, served to form a free space providing a fuel evaporating section between the fuel permeating plate 6 and the fuel electrode 2.

A unit cell having a reaction area of 10 cm² was prepared as in Example 1, except that the structure shown in FIG. 19 was used for forming the unit cell.

EXAMPLE 14

A fuel permeating plate 6 was prepared by forming a plurality of grooves 20 on one surface of a dense carbon plate sized at 32 mm×40 mm and having a thickness of 2 mm. The widths and the depths of the grooves were changed in the fuel permeating direction. To be more specific, the width of the groove 20 was gradually diminished from the fuel inlet port toward the other end from 1 mm to 0.5 mm. On the other hand, the depth of the groove was also gradually diminished from the fuel inlet port toward the other end from 1.5 mm to 1 mm.

Figure 20:
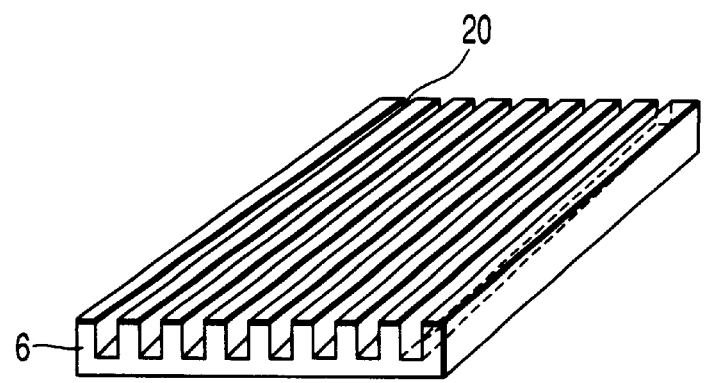
FIG. 20 is an oblique view showing the fuel permeating structure used in the fuel cell of Example 14 of the present invention.

A unit cell having a reaction area of 10 cm² was prepared as in Example 13, except that the structure shown in FIG. 20 was used for forming the unit cell.

EXAMPLE 15

A plurality of square through-holes each sized at 5 mm square were formed in a dense carbon plate sized at 32 mm×40 mm and having a thickness of 2 mm.

Figure 21:
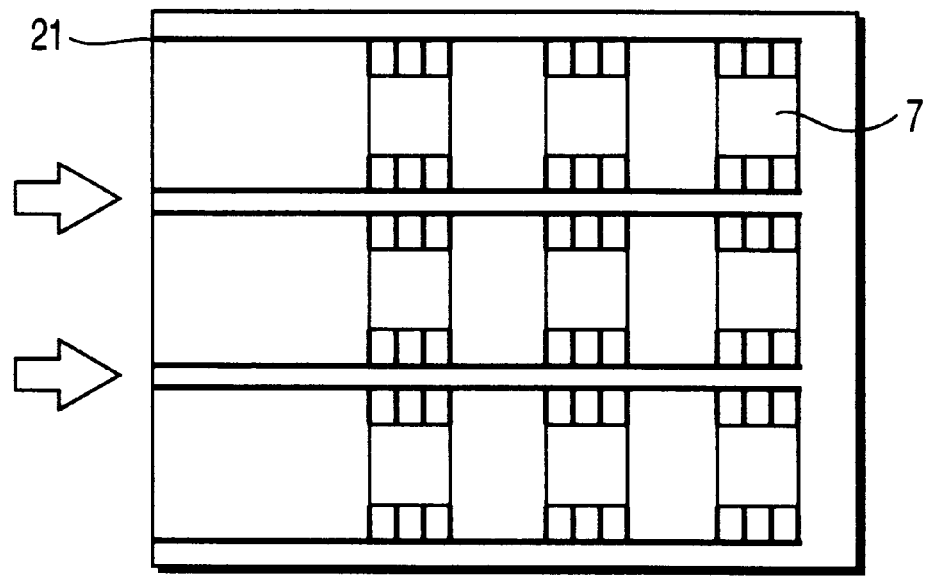
FIG. 21 is a plan view showing the fuel permeating-evaporating member used in the fuel cell of Example 15 of the present invention.

These through-holes functioned as a fuel evaporating section 7. Further, grooves 21 leading from one side of the carbon plate to the through-holes were formed on one surface of the carbon plate so as to prepare a fuel permeating-evaporating member as shown in FIG. 21. The grooves 21 were arranged at a pitch of 0.5 mm and each of these grooves 21 had a depth of 1.5 mm. The liquid fuel flows in the direction denoted by arrows.

A unit cell having a reaction area of 10 cm² was prepared as in Example 1, except that the fuel permeating-evaporating member was laminated on the fuel electrode 2 of the power generating section 4 to permit that surface of the fuel permeating-evaporating member on which the grooves 21 were not formed to be brought into contact with the fuel electrode.

EXAMPLE 16

Figure 22:
FIG. 22 is a plan view showing the fuel permeating-evaporating member used in the fuel cell of Example 16 of the present invention.

A fuel permeating-evaporating member was prepared by bundling hollows fibers 22 to form a plate having a thickness of 5 mm, as shown in FIG. 22. These hollow fibers 22 differed from each other in length and had an outer diameter of 0.5 mm and an inner diameter of 0.4 mm. In this case, the liquid fuel flows in the direction denoted by an arrow.

A unit cell having a reaction area of 10 cm² was prepared as in Example 1, except that the fuel permeating-evaporating member shown in FIG. 22 was used for forming the unit cell.

EXAMPLE 17

Figure 23A:
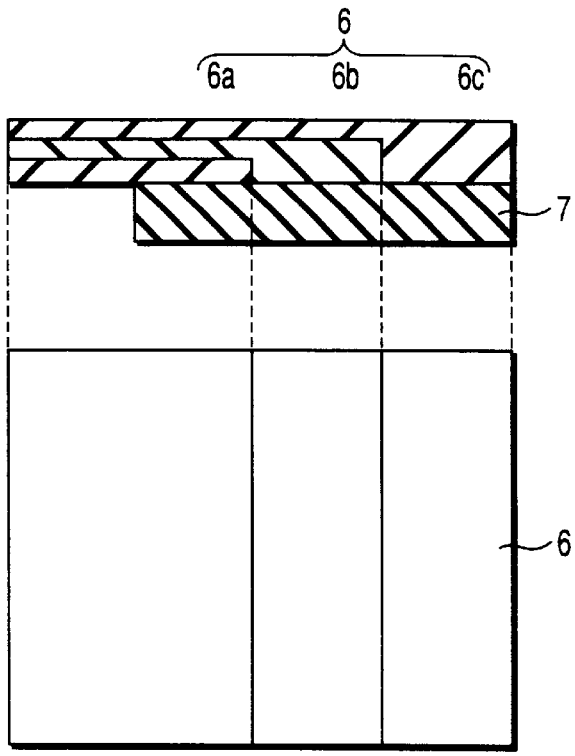
FIG. 23A is a cross sectional view showing the fuel permeating-evaporating structure used in the fuel cell of Example 17 of the present invention.

FIG. 23A is a cross sectional view showing the fuel permeating-evaporating structure prepared in this example. As shown in the drawing, a fuel permeating layer 6 is arranged on a fuel evaporating layer 7. The fuel permeating layer 6 consists of three members 6a, 6b and 6c. Since these three members 6a, 6b, 6c are arranged to extend from the fuel inlet port over the fuel evaporating layer 7, the fuel can be supplied through different routes. Incidentally, porous carbon plates each having an average pore diameter of 20 μm were used as the three members constituting the fuel permeating layer 6. Also, a porous carbon plate having an average pore diameter of 100 μm, sized at 32 mm×32 mm, and having a thickness of 5 mm was used as the fuel evaporating layer 7.

FIG. 23B is a plan view showing the fuel permeating member 6. The liquid fuel flows in the direction denoted by an arrow shown in FIG. 23A.

A unit cell having a reaction area of 10 cm² was prepared as in Example 1, except that the fuel permeating-evaporating member of the particular construction was disposed on the fuel electrode 2 of the power generating section.

In driving the fuel cell, a part of the fuel permeating plate 6 is allowed to project to the outside of the holder so as to permit the projecting portion to be dipped in the liquid fuel tank. As a result, the liquid fuel permeates through the three porous carbon plates so as to be supplied to the fuel evaporating layer 7.

EXAMPLE 18

Prepared was a stainless steel plate member having an outer size of 32 mm×40 mm, a thickness of 1.5 mm and a hollow portion having a thickness of 0.5 mm. A fuel permeating plate 6 was prepared by forming a plurality of openings each having a diameter of 1 mm on one surface of the stainless steel plate.

Figure 24A:
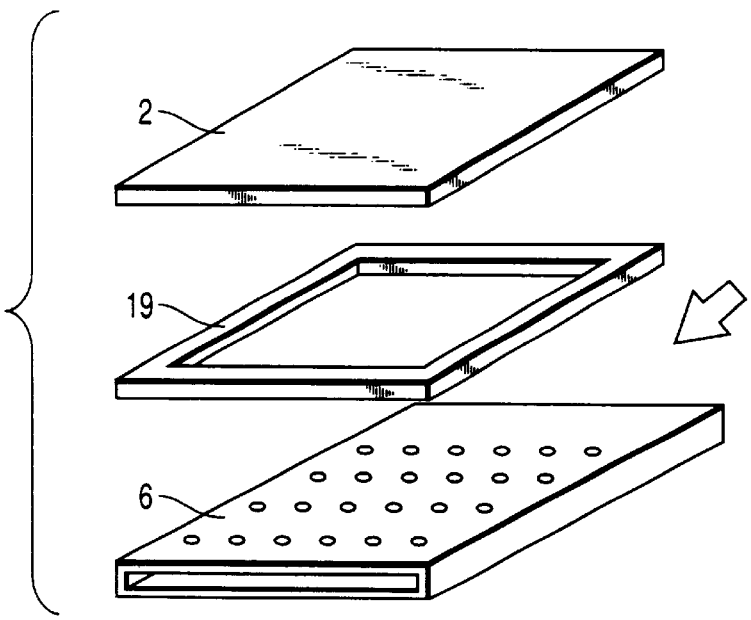
FIG. 24A is an oblique view showing the fuel permeating-evaporating structure used in the fuel cell of Example 18 of the present invention.

The fuel permeating plate 6 thus prepared was arranged on the fuel electrode 2 of the power generating section 4 with a carbon frame 19 interposed therebetween, as shown in FIG. 24A. The fuel permeating plate 6 was arranged such that the surface provided with the openings faces the fuel electrode 2. The carbon frame 19, which was sized at 32 mm square and had a width of 2 mm and a thickness of 1 mm, serves to form a free space providing a fuel evaporating section between the fuel permeating plate and the fuel electrode.

A unit cell having a reaction area of 10 cm² was prepared as in Example 1, except that the structure shown in FIG. 24A was used for preparing the unit cell.

Figure 24B:
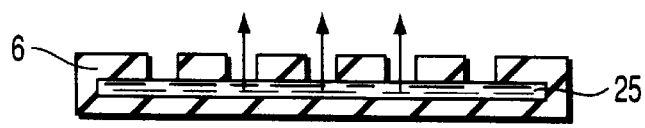
FIG. 24B is a cross sectional view showing the fuel permeating layer used in the fuel cell of Example 18 of the present invention.

The liquid fuel 25 is held within the hollow portion of the fuel permeating plate 6 and evaporated from the pores on the surface so as to be supplied to the fuel electrode, as shown in FIG. 24B.

It has been confirmed that the any of the fuel cells prepared in Examples 3 to 18 given above is substantially equal in performance to the fuel cell prepared in Example 1.

As described above, the fuel cell according to Example 1 has a simple structure and yet provides a high, stable voltage output because of the smooth feeding of the evaporated liquid fuel, without requiring a pump or a blower for the fuel supply. Thus, the present invention makes it possible to provide a fuel cell which exhibits a high performance with a simple system, and also to provide a small-sized fuel cell which has been difficult to realize by the conventional technology.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell, comprising:
 a fuel electrode having a first surface configured to be supplied with evaporated liquid fuel;
 an electrolyte plate arranged adjacent to a second surface of said fuel electrode opposite the first surface, an oxidant electrode arranged adjacent to said electrolyte plate and opposite to said fuel electrode, and
 a fuel evaporating portion configured to evaporate liquid fuel and to supply evaporated fuel to the first surface of the fuel electrode, said fuel evaporating portion positioned adjacent to the first surface of the fuel electrode.

2. The fuel cell according to claim 1, wherein the fuel electrode and/or the oxidant electrode functions as a catalyst electrode.

3. The fuel cell according to claim 2, wherein said catalyst electrode includes a conductive support member and a catalyst layer formed on said support member.

4. The fuel cell according to claim 1, which further comprises a fuel permeating layer configured to supply liquid fuel to the fuel evaporating portion which is in contact with the first surface of the fuel electrode.

5. The fuel cell according to claim 4, wherein said fuel permeating portion consists of a permeating member exhibiting a capillary phenomenon, and is configured to supply the liquid fuel to the fuel evaporating portion by the capillary force of the permeating member.

6. The fuel cell according to claim 4, wherein the fuel permeating layer is made of a material selected from the group consisting of porous materials, non-woven fabrics, and woven fabrics which produce a capillary action.

7. The fuel cell according to claim 6, wherein the porous material is one which has a pore diameter of 0.01 to 150 $\mu$m.

8. The fuel cell according to claim 7, wherein the porous material is one which has a pore volume of 20 to 90%.

9. The fuel cell according to claim 8, wherein the porous material is one which has a pore diameter of 0.5 to 100 $\mu$m.

10. The fuel cell according to claim 9, wherein the porous material is one which has a pore volume of 30 to 75%.

11. The fuel cell according to claim 4, wherein a distance between said fuel electrode and said fuel permeating layer is not more than 1 cm.

12. The fuel cell according to claim 11, wherein the liquid fuel permeating into the fuel permeating layer is evaporated by the reaction heat of the cell reaction.

13. A fuel cell, comprising:
a first power generating section and a second power generating section, which are placed on top of the other with a separator interposed therebetween, said first power generating section being composed of a first fuel electrode configured to be supplied with evaporated liquid fuel, a first fuel evaporating section configured to evaporate liquid fuel, a first electrolyte plate, and a first oxidant electrode, which are place sequentially one over another, said second power generating section being composed of a second fuel electrode configured to be supplied with evaporated liquid fuel, a second fuel evaporating section configured to evaporate liquid fuel, a second electrolyte plate, and a second oxidant electrode, which are place sequentially one over another, and a liquid fuel passage formed adjacent to both of said first and second power generating sections and configured to supply said first and second fuel evaporating portions with said liquid fuel through said liquid fuel passage.

14. The fuel cell according to claim 13, wherein the first fuel electrode and/or the fist oxidant electrode function as a catalyst electrode.

15. The fuel cell according to claim 14, wherein said catalyst electrode includes a conductive support member and a catalyst layer formed on said support member.

16. The fuel cell according to claim 13, which further comprises a first fuel permeating layer configured to supply liquid fuel to the first fuel evaporating portion which is in contact with the first fuel electrode.

17. The fuel cell according to claim 13, wherein the separator has oxidant gas feeding channels in its surface.

18. The fuel cell according to claim 13, wherein the separator has liquid fuel feeding grooves formed in its surface which is in contact with the first fuel permeating layer.

19. The fuel cell according to claim 13, wherein the first fuel permeating layer has a capillary action greater than that of the first liquid fuel passage.

20. The fuel cell according to claim 16, wherein the first fuel permeating portion is formed of a permeating member exhibiting a capillary action such that the liquid fuel is supplied to said fuel evaporating portion by the capillary action of the permeating member.

21. The fuel cell according to claim 13, wherein the first fuel permeating layer is made of a material selected from porous materials, non-woven fabrics, and woven fabrics which produce capillary action.

22. The fuel cell according to claim 21, wherein the porous material is one which has a pore diameter of 0.01 to 150 $\mu$m.

23. The fuel cell according to claim 22, wherein the porous material is one which has a pore volume of 20 to 90%.

24. The fuel cell according to claim 23, wherein the porous material is one which has a pore diameter of 0.5 to 100 $\mu$m.

25. The fuel cell according to claim 24, wherein the porous material is one which has a pore volume of 30–75%.

26. The fuel cell according to claim 16, wherein a distance between said fuel electrode and said fuel permeating layer is not more than 1 cm.

27. The fuel cell according to claim 26, wherein the fuel permeating said fuel permeating layer is evaporated by the reaction heat of the cell reaction.

28. A fuel cell, comprising:
an oxidant electrode,
an electrolyte plate disposed on said oxidant electrode;
a fuel electrode disposed on said electrolyte plate and configured to be supplied with evaporated liquid fuel,
a liquid fuel holding portion disposed on said fuel electrode; and
a liquid fuel evaporating portion configured to evaporate liquid fuel supplied from said liquid fuel holding portion and arranged in contact with both said fuel electrode and said liquid fuel holding portion.

29. A fuel cell, comprising:
an oxidant electrode;
an electrolyte plate disposed on said oxidant electrode;
a fuel electrode disposed on said electrolyte plate and configured to be supplied with evaporated liquid fuel;
a liquid fuel holding portion;
a plurality of unit cells each including a liquid fuel evaporating portion configured to evaporate liquid fuel and arranged in contact with each of said fuel electrode and said liquid fuel holding portion; and
a liquid fuel source connected to each of said plurality of unit cells via each of said liquid fuel holding portions.

30. A fuel cell, comprising:
an electrolyte plate including two surfaces,
an oxidant electrode and a fuel electrode configured to be supplied with evaporated liquid fuel, mounted to face the two surfaces, respectively, of said electrolyte plate,
a liquid fuel evaporating portion mounted on said fuel electrode and configured to evaporate liquid fuel, and
a liquid fuel holding portion connected to said liquid fuel evaporating portion and positioned not more than 1 cm apart from said fuel electrode 31. A fuel cell, comprising:
an electrolyte plate including two surfaces,
an oxidant electrode and a fuel electrode configured to be supplied with evaporated liquid fuel, mounted to face the two surfaces, respectively, of said electrolyte plate; and a liquid fuel permeating portion for holding a liquid fuel,
wherein the liquid fuel held by the liquid fuel permeating portion is evaporated by the reaction heat of the cell reaction and evaporated liquid fuel is supplied to said fuel electrode.

32. A fuel cell, comprising:

an oxidant electrode, an electrolyte plate arranged on said oxidant electrode, a fuel electrode mounted on said electrolyte plate and configured to be supplied with evaporated liquid fuel; and a liquid fuel permeating-evaporating member mounted on said fuel electrode and having a first side on the side of said fuel electrode and a second side opposite to said first side, said first side evaporating liquid fuel.

* * * * *